United States Patent

[11] 3,612,208

| [72] | Inventor | Hugo S. Ferguson<br>Averill Park, N.Y. |
|---|---|---|
| [21] | Appl. No. | 30,160 |
| [22] | Filed | Apr. 20, 1970 |
| [45] | Patented | Oct. 12, 1971 |
| [73] | Assignee | Air Cushion Vehicles, Inc.<br>Poestenkill, N.Y. |

[54] AIR-CUSHION VEHICLE WITH REVERSE THRUST BRAKES
7 Claims, 9 Drawing Figs.

[52] U.S. Cl. ........................................... 180/120, 180/123
[51] Int. Cl. ........................................... B60v 1/14
[50] Field of Search ................................ 180/120, 122, 117

[56] References Cited
UNITED STATES PATENTS

| 3,259,097 | 7/1966 | Van Veldhuizen et al. | 180/126 UX |
| 2,364,676 | 12/1944 | Warner | 180/120 UX |
| 3,292,721 | 12/1966 | Dobson | 180/120 |
| 3,401,766 | 9/1968 | Laufman et al. | 180/120 X |
| 3,486,577 | 12/1969 | Jackes | 180/120 |

*Primary Examiner*—A. Harry Levy
*Attorney*—Pennie, Edmonds, Morton, Taylor and Adams ABSTRACT: A single propeller mounted toward the front of the vehicle provides both propulsion and air cushion. Two point steering is provided by front and rear steering vanes with air channels on each side which direct a portion of the downstream flow of air, under the control of the front vanes, to the rear vanes. To reduce forward thrust without reducing engine power, collapsible airbrakes are mounted on the outer walls of the air channels and in their collapsed position form a part thereof. The airbrakes include flexible sheets which in their extended positions, form concave arcuate surfaces extending across respective air channels and outside thereof to intercept downstream flow of air and divert it outwardly of the vehicle.

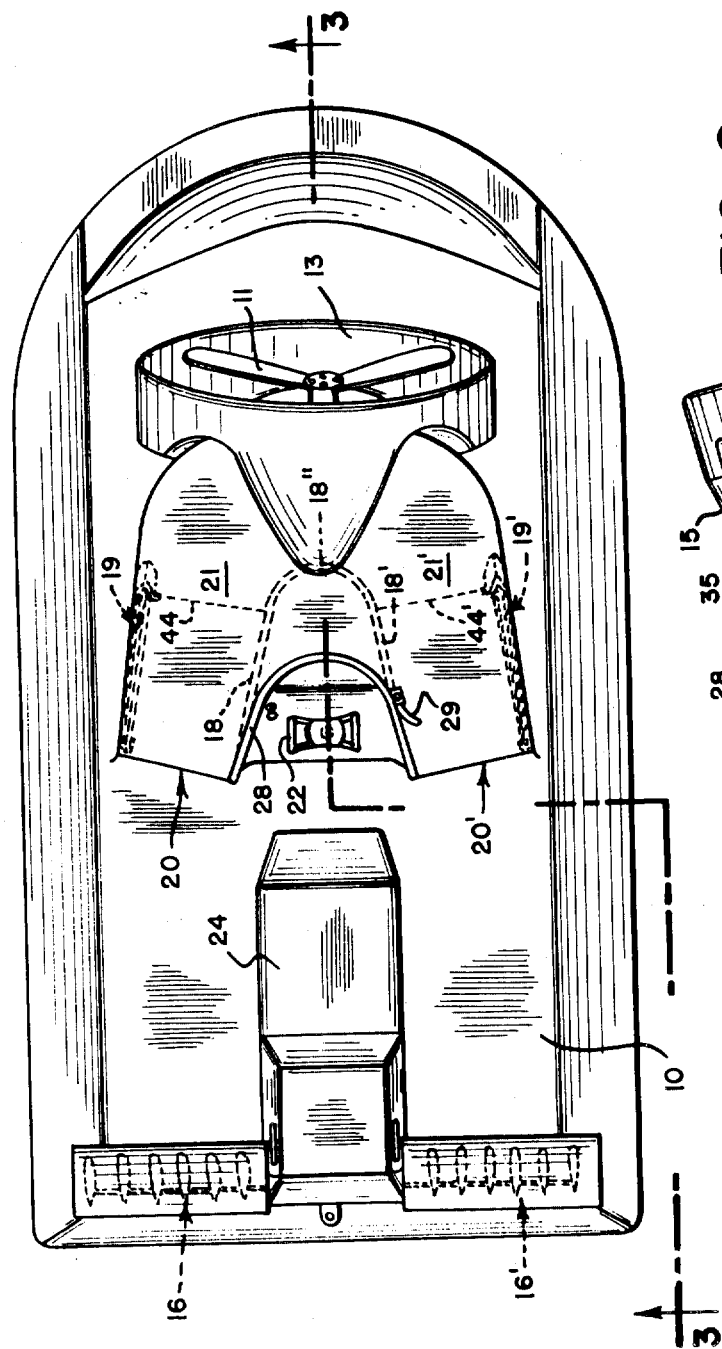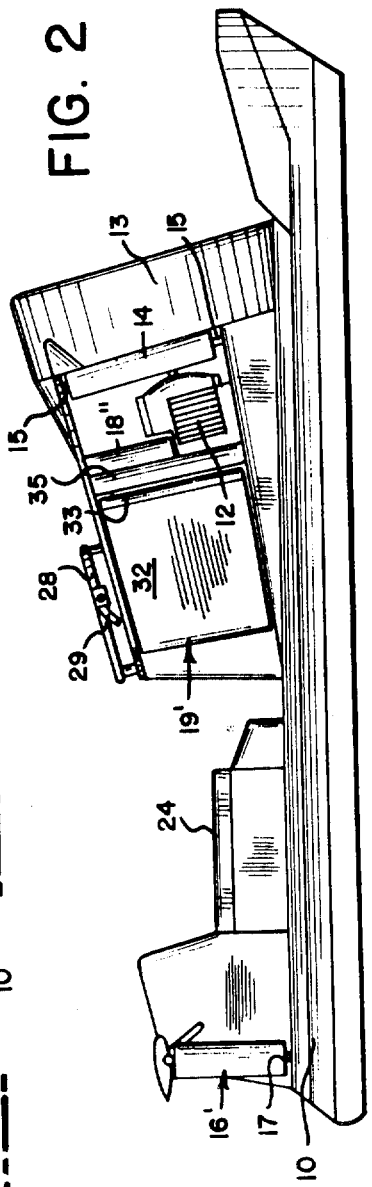

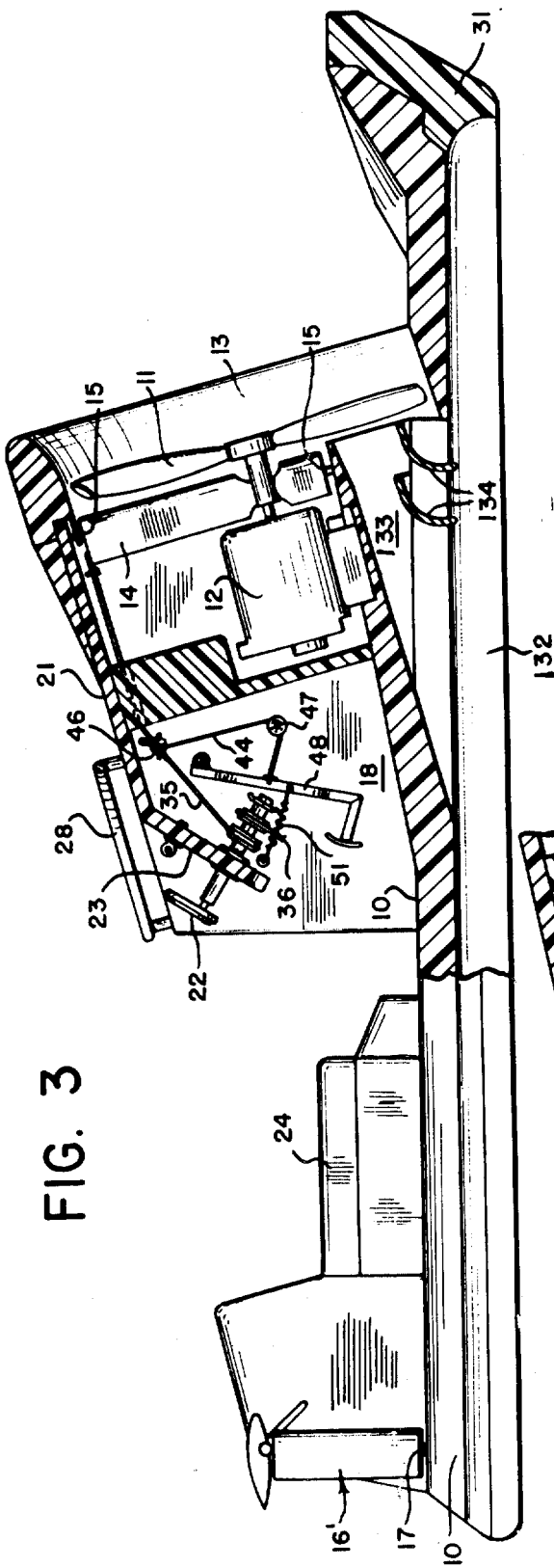
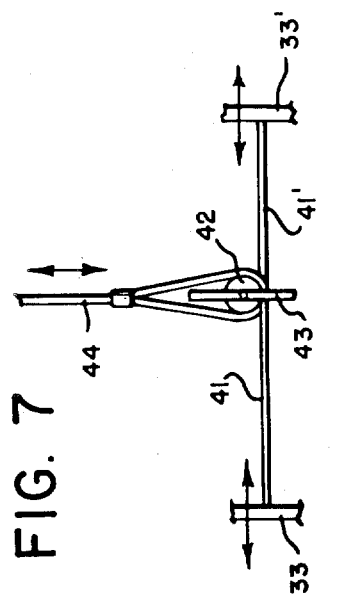
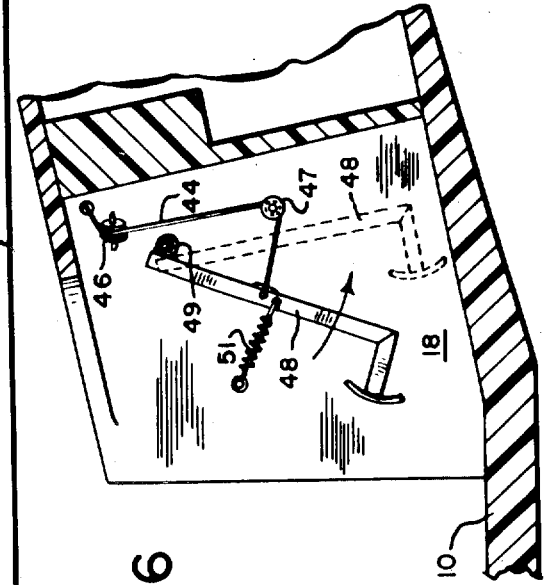
INVENTOR
Hugo S. Ferguson
BY
ATTORNEYS

PATENTED OCT 12 1971

INVENTOR
Hugo S. Ferguson
BY
ATTORNEYS

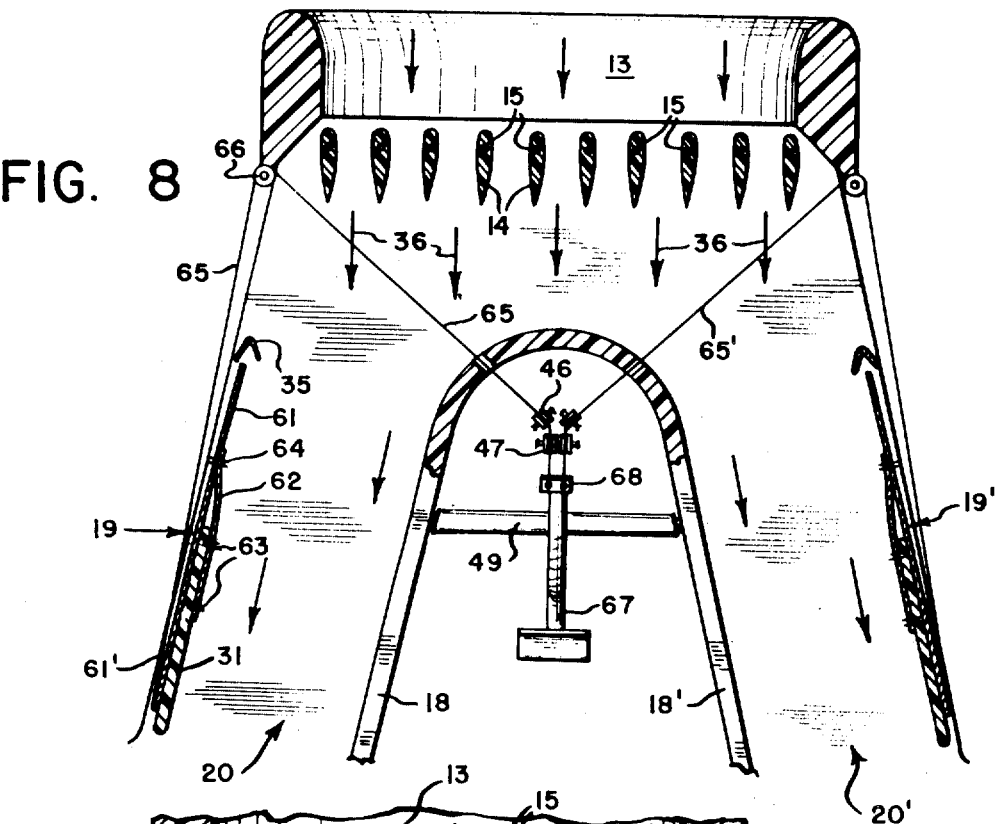

AIR-CUSHION VEHICLE WITH REVERSE THRUST BRAKES

BACKGROUND OF THE INVENTION

This invention relates to air-cushion vehicles, and particularly to means for controlling the thrust of such vehicles.

In U.S. application Ser. No. 2,810, filed Jan. 14, 1970 by Hugo S. Ferguson for "Air Cushion Vehicles," a vehicle is described in which a common source of air is employed for both the air cushion and propulsion. Two-point steering is provided by front and rear steering vanes with air channels on each side of the vehicle which direct a portion of the downstream flow of air, under the control of the front vanes, to the rear vanes. Joint control of front and rear vanes may be provided, with means for changing the relative vane angles to counter crosswinds and side slopes on hills. The vehicle described is highly maneuverable and capable of excellent performance, and yet is not unduly expensive.

In the vehicle, as specifically described in the aforementioned application, it is desirable to employ full power, or close to full power, whenever the vehicle is moving. This is to supply sufficient air underneath the vehicle to raise it off the supporting surface. In the vehicle specifically described, the design height is 1½ to 2 inches off the supporting surface under normal operating conditions. If, on the other hand, only a fraction of full power is used either in starting or stopping, the reduced air cushion may allow the vehicle to drag along the supporting surface. If the vehicle is operating on water, this may not be particularly troublesome. However, on land it may result in abrasion of the sidewalls and possibly damage from rocks, etc.

With full power applied, the vehicle accelerates quite rapidly. To stop quickly, it is necessary to turn the vehicle around until movement has ceased and then cut off the power. To an experienced driver, these movements are not difficult and may be quite exhilarating. However, a novice or a more cautious driver may be disturbed by the rapid acceleration in starting, and the need to turn around to stop, particularly when traveling downhill at high speed. Thus, it is desirable to provide means for controlling the forward propulsion thrust without reducing the air cushion.

The present invention provides collapsible reverse thrust brakes capable of reducing the net forward thrust to a low value while using full engine power.

SUMMARY OF THE INVENTION

In accordance with the invention, a pair of flexible sheets are employed, one for each air channel, and are mounted for movement between braking and nonbraking positions. In the nonbraking position, the flexible sheets are in general alignment with respective outer walls of the air channels, and preferably form part of the outer walls. In the braking position, each flexible sheet has a front concave arcuate surface extending at least partially across the respective air channel and laterally outside the air channel. These concave arcuate surfaces intercept a substantial portion of the downstream flow of air directed toward the respective air channels and divert the air outwardly of the vehicle.

The front surfaces of the flexible sheets, at their inner ends, make obtuse angles with respect to the direction of airflow impinging thereon, so that intercepted air is gradually directed toward the outer portions of the surfaces. At the outer portions the concave surfaces give a forward component to the airflow, thus providing some reverse thrust. This, together with the reduction in airflow through the channels, greatly reduces the overall forward thrust.

Various means may be employed for mounting the flexible sheets for movement between braking and nonbraking positions, and two constructions are shown in the specific embodiments.

In one embodiment the flexible sheets are of pliable material. Each pliable sheet is attached adjacent the front edges of a pair of stiff flexible sheets fixedly mounted in close proximity toward the rear thereof, preferably on an outer wall section of the air channel. In the collapsed position the front edges of the stiff flexible sheets are drawn together and the pliable sheet folds therebetween under the urging of the downstream flow of air, the combination forming part of the outer wall of the air channel. When the front edges of the stiff flexible sheets are separated, the pliable sheet forms a concave arcuate surface under the urging of the downstream airflow.

In another embodiment the flexible sheets are of stiff flexible material. A mounting sheet of stiff flexible material is fixedly mounted toward the rear thereof, preferably on an outer wall section of the air channel. The mounting sheet extends forwardly of the outer wall section and is affixed to the first sheet intermediate the ends thereof. In the nonbraking position the two sheets extend in general alignment with the outer wall section, with the rear portion of the first sheet overlapping the mounting sheet, the combination forming part of the outer wall of the air channel. A cable is attached to the rear portion of the first sheet near the free end thereof and is led over a pulley mounted on the forward structure of the vehicle. When tightened, the cable draws the rear portion of the first sheet outward and forward to form a concave arcuate surface.

BRIEF DESCRIPTION OF THE DRAWINGS

FIGS. 1 and 2 are plan and side views of an air-cushion vehicle incorporating collapsible reverse thrust brakes in accordance with the invention;

FIG. 3 is a cross section along the line 3—3 of FIG. 1;

FIGS. 6 and 7 show details of the control mechanism for the brakes of FIGS. 4 and 5; and FIGS. 8 and 9 are horizontal cross sections through the air channels showing another embodiment of collapsible airbrakes in closed and open positions.

DESCRIPTION OF THE SPECIFIC EMBODIMENTS

Figure 4:
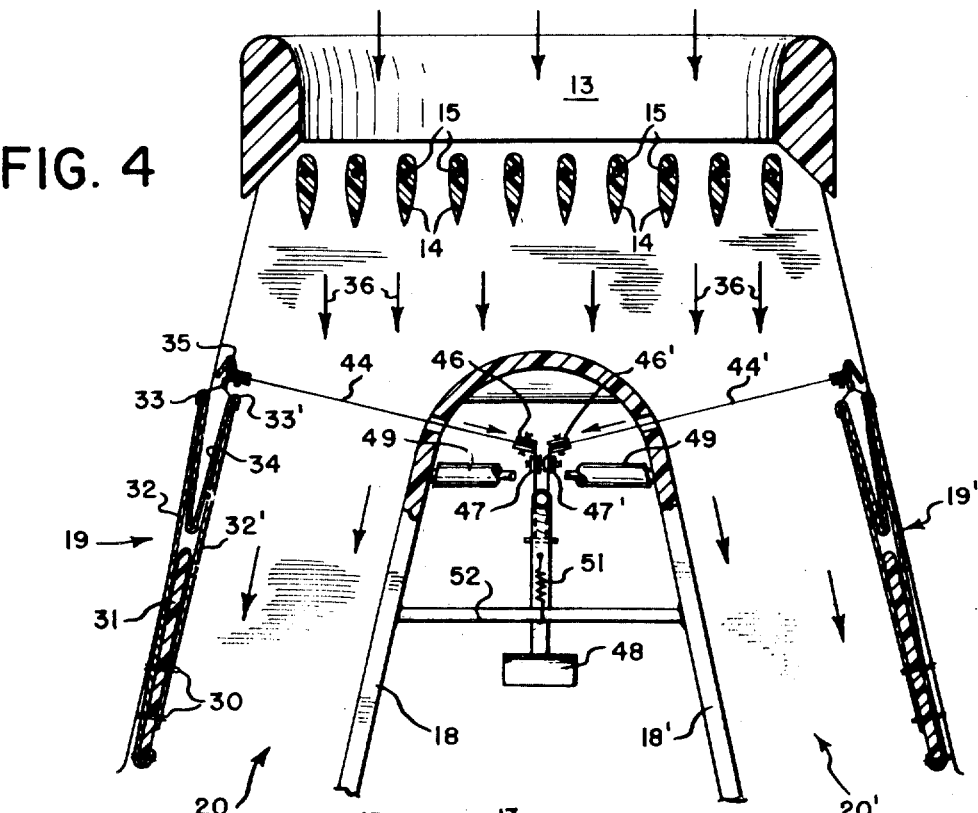
FIGS. 4 and 5 are horizontal cross sections through the air channels showing one embodiment of collapsible air brakes in closed and open positions.

Referring to FIGS. 1-3, an air-cushion vehicle is shown of the type described in detail in U.S. application Ser. No. 2,810, supra. A body platform 10 has mounted thereon an air propeller 11 driven by motor 12. A shroud 13 around the propeller forms a short duct which improves the propeller efficiency.

Immediately behind the propeller is a set of upwardly extending front steering vanes 14 mounted for rotation about upwardly extending axes 15 so that, by turning the vanes in either direction, the downstream flow of air from the propeller is directed to lateral angles on either side of the vehicle. Sets of upwardly extending rear steering vanes 16, 16' are positioned near the rear of the vehicle on each side thereof, and are mounted for rotation about upwardly extending axes 17.

Air channel means is mounted on the body platform 10 between the front and rear steering vanes. An inner member has upwardly and rearwardly extending laterally spaced walls 18, 18' which are joined at the front thereof, as indicated at 18''. The upper portion of the front end or nose 18'' is rounded to promote a smooth flow of air. The lower portion may be flat to provide room for engine 12.

Upwardly and rearwardly extending outer walls 19, 19' are laterally spaced from respective inner walls 18, 18' to form respective open-ended laterally spaced air channels 20, 20' which receive respective portions of the downstream flow of air from the propeller, under the control of the front steering vanes 14, and direct the flow of air therethrough to respective sets 16, 16' of rear steering vanes. Collapsible airbrakes, in their collapsed position, form part of the outer walls 19, 19' of the air channels, as will be explained later. The air channels are provided with top members 21, 21' which extend to the upper part of shroud 13 over the propeller, thereby preventing rearward flow of air from the propeller above the top members. This protects the operator from the propeller air blast. Also, air traveling from the air channels to the rear vanes forms air curtains on each side of the operator to protect him from spray, dust, etc.

A steering wheel 22 is mounted on a panel 23 attached to the sidewalls 18, 18' of the inner channel member, and a seat 24 is provided for the operator. A rail 28 may be provided in front of the operator's position and a hand throttle 29 is mounted thereon.

The body platform 10 is provided with a downwardly extending peripheral wall or skirt 31 which forms an open plenum chamber 132 beneath the vehicle. Air from the lower portion of the propeller 11 is admitted to the plenum chamber 132 through a slotlike opening 133 in the body platform 10. Fixed curved vanes 134 are mounted in the lower portion of the opening to direct a portion of the air to the forward part of plenum chamber 132, so as to approximately equalize the air pressure in various parts of the plenum chamber.

Provision may be made for an operator to control separately the front and rear steering vanes. However, as here shown, the front and rear steering vanes are controlled simultaneously by steering wheel 22 through a cable 35 leading to the front steering vanes, and a cable 36 leading to the rear steering vanes. The linkage is such that the front and rear steering vanes turn in opposite directions in making a turn. Advantageously means are provided for permitting the relative orientation of the front and rear vanes to be changed at will, so as to take care of crosswinds, side hills, etc. Such means are described in detail in the aforesaid U.S. application Ser. No. 2,810.

The air channels 20, 20' are spaced downstream of the front steering vanes 14, and the space therebetween opens laterally to the ambient air. Thus, as the front steering vanes are turned in one direction or the other from their center position, a portion of the downstream flow of air from the propeller is directed to the ambient air laterally outside the air channels, and provides a front steering force. Depending on the detailed design, at small steering angles air may or may not be directed outside the air channels, since the rear steering vanes may provide sufficient control. However, for at least larger angles, a substantial portion of the air will be directed outside the air channels.

The front joining section 18'' of the inner walls of the air channels is spaced sufficiently rearwardly of the front steering vanes 14 so that, as the vanes are angled to turn the vehicle, the downstream flow of air directed toward the air channel on the inside of a turn is reduced while flow of air directed toward the air channel on the outside of a turn is maintained. This assists in obtaining effective steering control at the rear of the vehicle.

Figure 5:
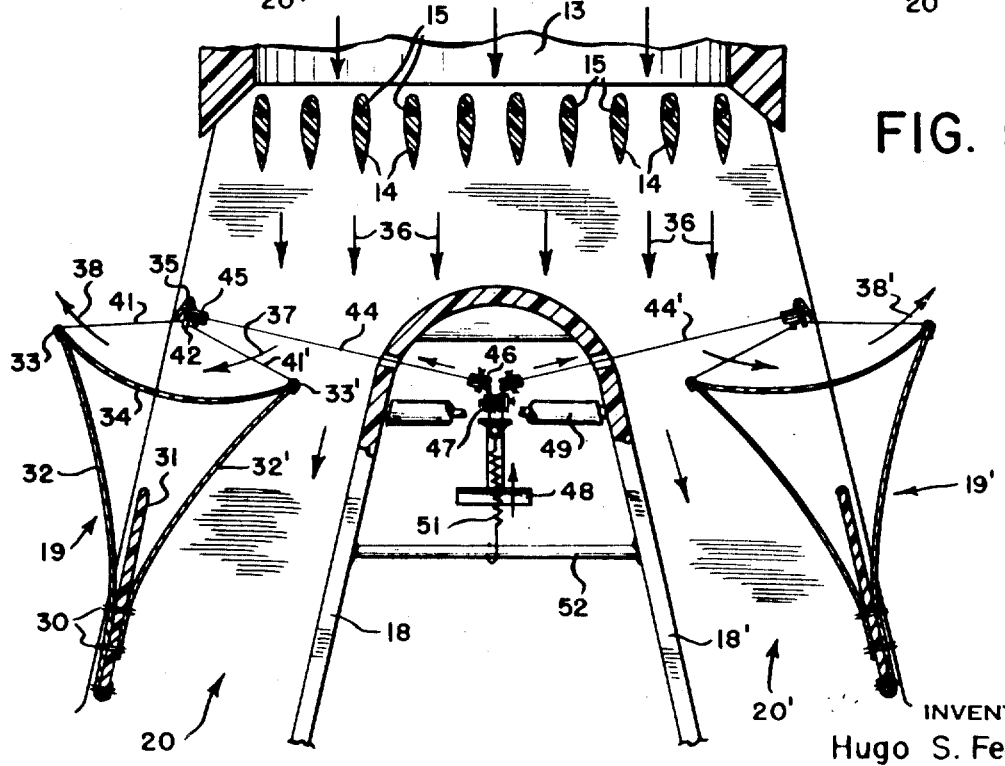

In accordance with the present invention, collapsible reverse thrust airbrakes are provided. FIGS. 4 and 5 illustrate one embodiment. Only the left or port side will be specifically referred to since the right or starboard side is similar.

Referring to FIGS. 4 and 5, outer wall section 31 of air channel 20 is fixed, and part of the body structure. A pair of stiff flexible sheets 32, 32' are fixedly attached to wall section 31, as by rivets 30 passing therethrough. Sheets 32, 32' may be of springy sheet metal and advantageously are formed to spring outwards, as shown in FIG. 5, and bias the front edges 33, 33' thereof toward their separated position. A sheet 34 of flexible, pliable material, e.g. of fabric or plastic, is attached to the front edges 33, 33' of sheets 32, 32' and extends therebetween. Sheets 32, 32' are called stiff flexible sheets since, although they are sufficiently flexible to bend between collapsed and extended positions, as illustrated in FIGS. 4 and 5, they are also sufficiently stiff to support the pliable sheet 34 and to resist downstream air forces when in the extended position. Sheet 34 is called a flexible, pliable sheet since, in addition to being flexible, it is capable of being folded as in FIG. 4, and of assuming the curvature of FIG. 5.

The vertical dimensions of sheets 32, 32' and 33 are approximately the full height of the air channel 20, so that in the collapsed position of FIG. 4 the sheets 32, 32' are in general alignment with the fixed section 31 and form part of the outer wall of the air channel. FIG. 4 shows the front ends 33, 33' slightly separated, for clarity of illustration, but in practice they will be drawn as tightly together as feasible.

A front nose piece 35 is fixedly attached to the body platform 10 and the top member 21 and covers the ends, 33, 33' when fully drawn together. In collapsing to the position of FIG. 4, air pressure from the propeller, as indicated by arrows 36, folds the pliable sheet 34 between the stiff sheets 32, 32'.

With the front edges 33, 33' separated, as shown in FIG. 5, air pressure on the pliable sheet 34 forms it into a concave arcuate surface. The inner portion of the arcuate surface extends partially across the air channel 20, whereas the outer portion extends laterally outside the air channel. Thus the pliable sheet 34 intercepts a portion of the downstream flow of air directed toward air channel 20, as indicated by arrow 37, and diverts it outwardly of the air channel, as indicated by arrow 38.

With the vehicle moving straight ahead, the extended airbrakes intercept a major portion of the air directed toward channels 20 and 20', thereby substantially reducing the forward thrust produced by the remainder of the air passing through the channels. Also the diverted air has a forward component, as shown by arrows 38, 38' so that some reverse thrust is produced. There may be some forward thrust produced by the flow of air under the vehicle which produces the air cushion. The net result, however, is to greatly reduce the overall forward thrust. If desired, the air brakes could be designed to extend even farther across the air channels than shown.

To control the separation and bringing together of the front edges 33, 33' of the stiff flexible sheets, a pair of cables 41, 41' are attached to the front edges, preferably about midway from top to bottom. Cables 41, 41' pass around a rod 42 (FIG. 7) which is fixedly attached to the upstanding nose piece 35, and are kept from slipping off by a strip 43 attached to rod 42. Cables 41, 41' are then fastened together to form a single control cable 44. Cable 44 extends upwardly and passes around guide pulley 45, then through a hole in wall 18, around guide pulleys 46 and 47, and the end is attached to foot thready 48 (FIG. 6). Pulley 45 may be mounted near the top of nose piece 35 or on the under side of top 21 of the air channel. Pulleys 46 and 47 may be mounted in any suitable manner, as on struts extending across the space between walls !18, 18'. These details are omitted in the drawings for clarity of illustration.

Treadle 48 rotates about an axle 49 suitably mounted between the walls 18, 18', and is biased by tension spring 51 attached to a cross bar 52. Accordingly, cable 44 normally pulls the front edges 33, 33' of sheets 32, 32' together, as shown in FIG. 4. Depressing treadle 48 allows the edges to separate to the position shown in FIG. 5.

Referring to FIGS. 8 and 9, a different construction of the airbrakes is shown. Again, the airbrakes on each side of the vehicle are similar, and only the one on the left will be referred to specifically.

Here sheets 61 and 62 are both of stiff flexible material such as springy sheet metal formed to lie normally in the position shown in FIG. 8. Supporting sheet 62 is fixedly mounted toward the rear thereof on the fixed outer wall section 31 of the air channel 20, as by rivets 63. Sheet 62 extends somewhat forwardly of the front edge of wall section 61. The front end of sheet 62 is fixedly attached to sheet 61 intermediate the ends thereof, as by rivets 64. In the nonbraking position shown in FIG. 8, sheets 61 and 62 extend in general alignment with wall section 31 and form part of the outer wall of air channel 20, the rear portion 61' of sheet 61 overlapping sheet 62. Nosepiece 35 directs air flow around the free front end of sheet 61 to avoid excessive vibration thereof.

A cable 65 is attached to the rear end of sheet 61 and passes around a pulley 66 suitably mounted on the forward part of the vehicle, as on shroud 13. When tightened, cable 65 pulls the rear end of sheet 61 forwardly and outwardly to the position shown in FIG. 9. The front portion of sheet 62 bends as sheet 61 bends, and the resistance to bending of the two sheets causes the front of sheet 61 to assume a concave arcuate surface. The inner portion of sheet 61 extends partially across air channel 20 and the outer portion extends laterally outside the air channel. Hence a substantial portion of the air directed toward the air channel is intercepted and diverted outwardly of the vehicle. The inner portion of the arcuate surface of sheet 61 may remain approximately flat, but the front surface is at an obtuse angle with respect to the direction of airflow indicated by arrows 36 so that the intercepted air will be diverted gradually to the more curved outer portion of the sheet.

Cable 65 is led back through suitably positioned guide pulleys to treadle 67 in a manner generally like that explained for the embodiment of FIGS. 4 and 5, and need not be described again. The treadle is pivoted intermediate its ends, and cables 65, 65' attached to the upper end of the treadle by a clamp 68, so that when the bottom of the treadle is toward the rear, the airbrakes close as in FIG. 8 due to the springiness of sheets 61 and 62.

The operation of the embodiment of FIGS. 8 and 9 is generally similar to that of FIGS. 4 and 5, and need not be repeated.

If desired, the airbrakes of both embodiments could be positioned toward the rear of the air channels, with fixed outer wall sections of the air channels extending forwardly of the airbrakes, but the structures then become more complicated.

I claim:

1. An air-cushion which comprises
   a. a body,
   b. means for propelling and supporting said body on an air cushion including air propelling means mounted toward the forward end of said body and adapted to produce a downstream flow of air in the rearward direction of the vehicle,
   c. front steering means for changing the direction of said downstream flow of air to lateral angles on either side of the vehicle,
   d. rear steering means positioned toward the rear of the vehicle on each side thereof and adapted to divert downstream flow of air supplied thereto to lateral angles on either side of the vehicle,
   e. a pair of air channels spaced downstream of said front steering means with the space therebetween opening laterally to the ambient air,
   f. said air channels being laterally spaced and having respective inner and outer walls extending upwardly and rearwardly of said body for receiving portions of said downstream flow of air under the control of said front steering means and directing the flow of air therethrough to said rear steering means,
   g. a pair of flexible sheets for providing air brakes,
   h. mounting means for mounting said flexible sheets for movement between braking and nonbraking positions,
   i. said flexible sheets in their nonbraking position being in general alignment with respective outer walls of said air channels,
   j. each flexible sheet in its braking position having a front concave arcuate surface extending at least partially across the respective air channel and laterally outside the air channel to intercept a substantial portion of the downstream flow of air directed toward the air channel and divert it outward of the vehicle,
   k. and control means for moving said flexible sheets between said nonbraking and braking positions.

2. An air-cushion vehicle in accordance with claim 1 in which said flexible sheets are mounted on respective outer wall sections of the air channels and extend at least partially across the front of the respective air channel in the braking position thereof.

3. An air-cushion vehicle in accordance with claim 1 in which said pair of flexible sheets are of pliable material, and in which said mounting means includes a pair of stiff flexible sheets for each of said pliable flexible sheets, each pair of stiff flexible sheets being fixedly mounted in close proximity toward the rear thereof and the respective pliable flexible sheet being attached adjacent the front edges thereof whereby air pressure forms said concave arcuate surface of the pliable sheet upon separation of said front edges and folds the pliable sheet between the stiff sheets upon bringing together said front edges, said control means being adapted to control the separation and bringing together of said front edges.

4. An air-cushion vehicle in accordance with claim 3 in which said pair of stiff flexible sheets are fixedly mounted on the outer wall of the corresponding air channel and extend forwardly beyond the front thereof.

5. An air-cushion vehicle in accordance with claim 4 in which said stiff flexible sheets are of springy material, the stiff flexible sheets of each pair being formed and mounted to bias the front edges thereof toward their separated position, said control means being adapted to draw said front edges together and allow separation thereof.

6. An air-cushion vehicle in accordance with claim 1 in which said pair of flexible sheets are first sheets of stiff flexible material, and said mounting means includes a pair of second sheets of stiff flexible material, each second sheet being fixedly mounted toward the rear thereof and the front end thereof being fixedly attached to the respective first sheet intermediate the ends thereof, respective first and second sheets extending in general alignment with the outer wall of the respective air channel in the nonbraking position thereof with the rear portion of the first sheet overlapping the second sheet, said control means including means attached to said rear portion of the first sheet near the free end thereof for drawing said rear portion forwardly and outwardly to bend said first sheet to form said concave arcuate surface.

7. An air-cushion vehicle in accordance with claim 6 in which each second sheet is rigidly attached to the outer wall of the respective air channel and extends forwardly thereof.